(12) United States Patent
Montgomery et al.

(10) Patent No.: US 8,919,977 B2
(45) Date of Patent: Dec. 30, 2014

(54) LAMP COMPRISING A PHOSPHOR, RADIATION SOURCE, OPTICAL SYSTEM AND HEATSINK

(75) Inventors: David James Montgomery, Oxford (GB); James Rowland Suckling, Oxford (GB); Katsuhiko Kishimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 95 days.

(21) Appl. No.: 13/577,277

(22) PCT Filed: Feb. 9, 2011

(86) PCT No.: PCT/JP2011/053310
§ 371 (c)(1),
(2), (4) Date: Sep. 27, 2012

(87) PCT Pub. No.: WO2011/099640
PCT Pub. Date: Aug. 18, 2011

(65) Prior Publication Data
US 2013/0010492 A1      Jan. 10, 2013

(30) Foreign Application Priority Data
Feb. 9, 2010  (GB) ................................. 1002090.7

(51) Int. Cl.
| | | |
|---|---|---|
| *F21V 29/00* | (2006.01) | |
| *F21K 99/00* | (2010.01) | |
| *F21S 8/10* | (2006.01) | |
| *G03B 21/20* | (2006.01) | |
| *F21Y 101/02* | (2006.01) | |

(52) U.S. Cl.
CPC . *F21V 29/22* (2013.01); *F21K 9/52* (2013.01); *F21K 9/56* (2013.01); *F21S 48/1163* (2013.01); *F21S 48/328* (2013.01); *G03B 21/204* (2013.01); *F21Y 2101/02* (2013.01); *F21Y 2101/025* (2013.01)
USPC ............. 362/84; 362/259; 362/268; 362/293; 362/294

(58) Field of Classification Search
CPC ....... F21V 7/0025; H01L 33/60; H01L 24/17; F21S 48/1159; F21S 48/1163
USPC .............. 362/84, 259, 268, 293, 294, 296.01, 362/300–304, 307, 308, 311.01, 311.02, 362/326–328, 330, 341, 347, 350, 373, 507, 362/538, 539, 545; 250/483.1, 484.1, 250/486.1, 487.1, 488.1, 493.1, 504 R; 313/498, 501–503, 512

See application file for complete search history.

(56) References Cited

U.S. PATENT DOCUMENTS 7,165,871 B2 *  1/2007  Takeda et al. .................. 362/538
7,540,616 B2 *  6/2009  Conner .......................... 353/20

(Continued)

FOREIGN PATENT DOCUMENTS

| EP | 1795798 A1 | 6/2007 |
| EP | 1965244 A2 | 9/2008 |

(Continued)

OTHER PUBLICATIONS

Suckling et al., "Laser headlight for Next Generation Automotive Lighting", Announced on Sep. 27, 2011, Academic Conference: ISAL2011 (International Symposium on Automotive Lighting 2011) (Sep. 26-28, 2011).

(Continued)

*Primary Examiner* — Hargobind S Sawhney
(74) *Attorney, Agent, or Firm* — Renner, Otto, Boisselle & Sklar, LLP (57) ABSTRACT

A lamp comprises a thin layer of phosphor (105,113) which is irradiated (46), for example by ultraviolet radiation, by a source which typically comprises a laser diode and a condenser (101,111). This causes the phosphor (105,113) to emit visible light with a Lambertion-type emission pattern. An optical system such as a reflector (102,115) concentrates the light from the phosphor (105,113). The phosphor (105,113) is thermally connected to a heatsink (103,116), of example by a plate (114) of sapphire glass, so as to dissipate the heat produced by the phosphor (105,113). The phosphor (105) may be mounted on a plane reflector (104) disposed on or comprising the heatsink (103) and facing a curved reflector (102) and the radiation source. Alternatively, the optical system may have an optical axis and the phosphor (113) may be substantially flat and inclined with the respect to the optical axis.

16 Claims, 9 Drawing Sheets

(56) References Cited

U.S. PATENT DOCUMENTS

| | | | |
|---|---|---|---|
| 2004/0159900 A1 | 8/2004 | Ouderkirk et al. | |
| 2005/0105301 A1 | 5/2005 | Takeda et al. | |
| 2009/0052158 A1 | 2/2009 | Bierhuizen et al. | |
| 2009/0052189 A1* | 2/2009 | Kon | 362/296.01 |
| 2009/0154137 A1* | 6/2009 | Bierhuizen et al. | 362/84 |
| 2009/0168395 A1 | 7/2009 | Mrakovich et al. | |
| 2009/0316384 A1* | 12/2009 | Kanayama et al. | 362/84 |
| 2009/0322197 A1 | 12/2009 | Helbing | |
| 2009/0322205 A1 | 12/2009 | Lowery | |

FOREIGN PATENT DOCUMENTS

| | | | | |
|---|---|---|---|---|
| JP | 07-318998 | | 12/1995 | |
| JP | 2003-295319 | | 10/2003 | |
| JP | 2004-241142 | | 8/2004 | |
| JP | 2004-258402 | | 9/2004 | |
| JP | 2004-354495 | | 12/2004 | |
| JP | 2004354495 A | * | 12/2004 | G02F 1/13357 |
| JP | 2005-331468 | | 12/2005 | |
| JP | 2006-331683 | | 12/2006 | |
| JP | 2007200782 A | * | 8/2007 | |
| JP | 2007323858 A | * | 12/2007 | |
| JP | 2008108553 A | * | 5/2008 | |
| JP | 2008-192317 | | 8/2008 | |
| JP | 2008234908 A | * | 10/2008 | |
| JP | 2009266437 A | * | 11/2009 | |
| WO | WO 2006/124993 | | 11/2006 | |
| WO | WO 2008149250 A1 | * | 12/2008 | G02B 6/00 |
| WO | 2009/024952 A2 | | 2/2009 | |
| WO | 2009/115976 A1 | | 9/2009 | |

OTHER PUBLICATIONS

International Search Report for corresponding International Application No. PCT/JP2011/053310 mailed May 24, 2011.

Form PCT/ISA/237 for corresponding International Application No. PCT/JP2011/053310 dated May 24, 2011.

UK Search Report for corresponding UK Application No. GB1002090.7 dated May 13, 2010.

* cited by examiner

LAMP COMPRISING A PHOSPHOR, RADIATION SOURCE, OPTICAL SYSTEM AND HEATSINK

TECHNICAL FIELD

The present invention relates to a lamp. Such a lamp may be used as a luminaire or automotive lamp and may incorporate a laser or LED as an exciting system with a remote phosphor as a prime illuminant. Such a lamp may allow a higher efficiency or smaller size or lighter lamp to meet automotive regulations.

BACKGROUND ART

Figure 1A:
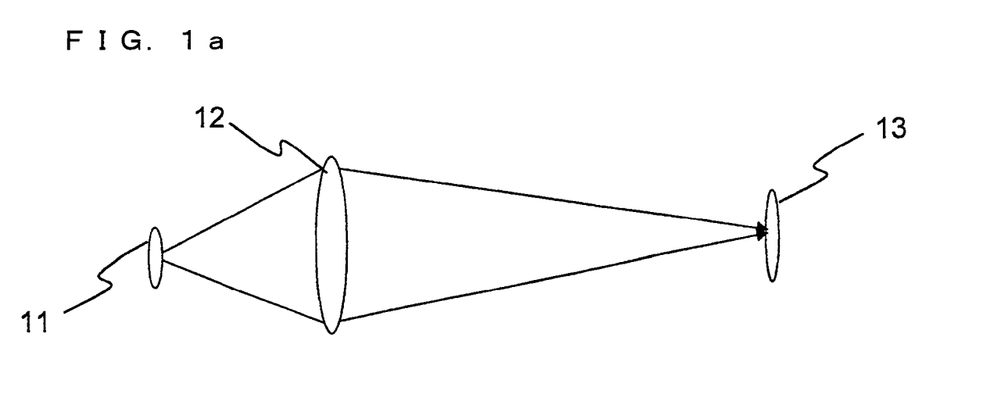
FIGS. 1a and 1b illustrate typical collimated optical illumination system.
Figure 1B:
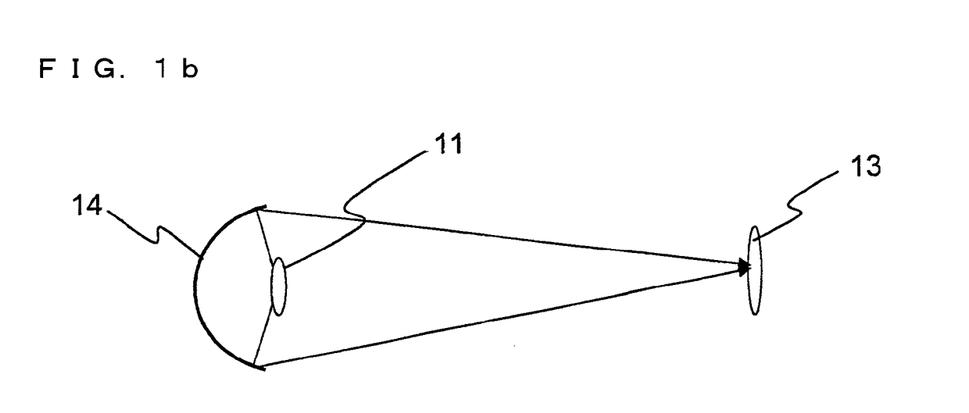

FIG. 1a of the accompanying drawings illustrates a simple illumination system illustrating a source 11 being concentrated by a lens 12 to meet a target brightness on the illumination area 13. FIG. 1b of the accompanying diagrams also shows a similar system to meet the target 13 but with a reflector 14. The description below also applies to a combined or more complex system comprising reflectors and/or lenses, although these are not illustrated here.

Figure 2A:
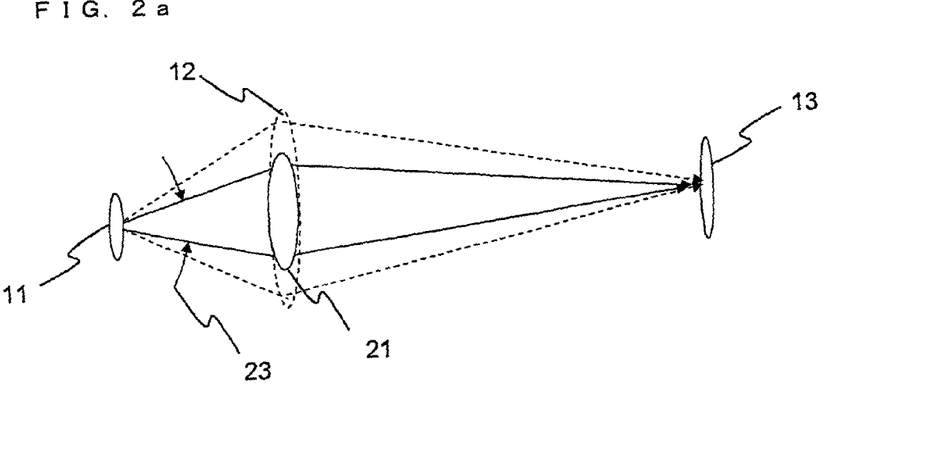
FIGS. 2a and 2b illustrate a smaller version of the typical system, with smaller focusing elements.
Figure 2B:
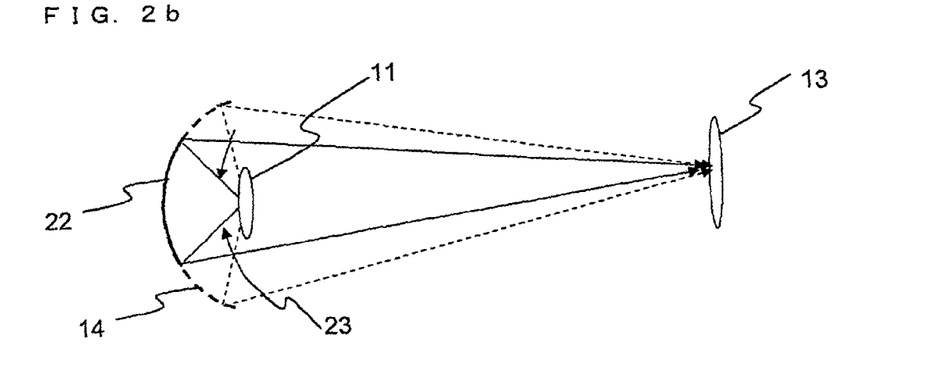

In order to reduce the size of these systems, two modifications can be made. FIGS. 2a and 2b illustrate the first of these modifications. This modification involves simply making the lens 21 or the reflector 22 smaller. The effect of this is that the angle of acceptance of the light from the source 11 will be reduced. Thus the illumination on the target area 13 will be reduced. The source light must either be made brighter (reduced efficiency) or the angular emission of the source must be more collimated 23 in order to meet the target 13.

Figures 3A, 3B:
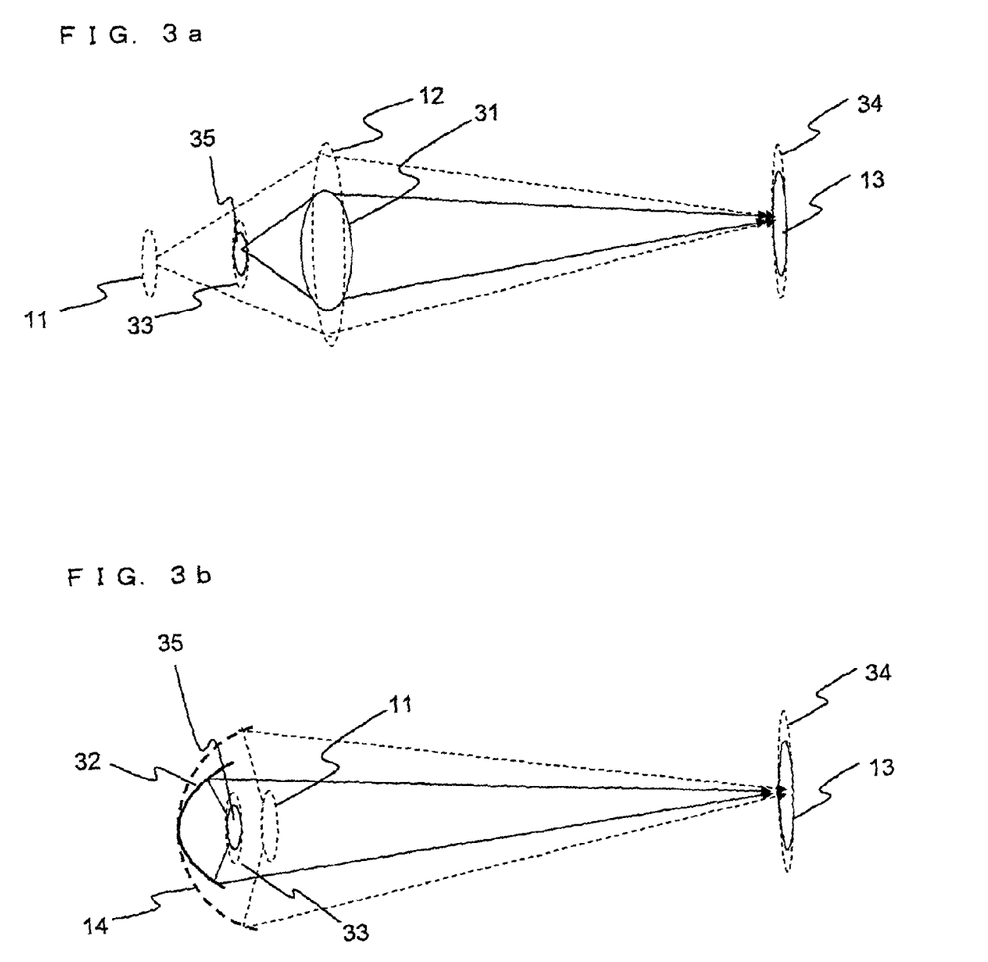
FIGS. 3a and 3b illustrate a smaller version of the typical system with more powerful optical elements.

FIGS. 3a and 3b illustrate the second modification, which is to increase the optical focusing power of the lens 31 and reflector 32 and move the source 33 closer to the optics in order to maintain focus on the target (or collimation in the far field.). The acceptance angle is maintained, but the magnification of the system has now increased because of the reduced source distance. However, the source image 34 on the target or far field has increased so that the brightness has decreased. In order to maintain the target brightness 13, the source light must be made brighter (reduced efficiency) or the source must be made smaller in size 35.

This illustrates that the product of source size and angular emission width predominantly determines the ultimate size for a given efficiency required to meet an illumination target. The actual analysis for real sources is more complex but the same essential result holds true and holds for all linear geometrical optical systems.

This product is called "etendue" and is generally a conserved quantity for these optical systems.

Thus for real lamp and headlight systems, whose efficiency and collimation is important, the size is fundamentally determined by the bulb or LED size and to a lesser extent by the angular distribution. The minimum size is determined by physical limits and for bright lamps, thermal considerations can take precedence. Angular distribution can be controlled somewhat by using integrated reflector systems; however these essentially recycle light back through the source. The effect of this is to create absorption which can reduce the efficiency improvement and to worsen the thermal environment around the source.

For example, a typical high beam section of an LED headlamp can have a system front area in excess of 8000 mm$^2$.

JP 2005/331468 (Sharp, published 2 Dec. 2005) illustrates one method to improve angular distribution by incorporating the light source in a reflector cup and directing the source back towards a parabolic reflector. This system illustrates the method of recycling light and changing the angular profile of the source emission.

JP 2004/241142 (Koito Manufacturing, published 26 Aug. 2004) illustrates a different system whereby a single colour LED is focused onto a phosphor source which is then collimated by a reflector/lens structure. The size of the phosphor is determined by the quality of the focus of the LED, so the etendue is fundamentally still determined by the LED and phosphor emission.

One route to achieve a smaller source size is to use the superior focusing properties of a laser, where the beam focus can be very small. If a small phosphor is placed at the focus point, then a very low etendue source can be produced. This approach is known in the prior art.

JP 7-318998 (Mitsubishi, published 8 Dec. 1995) discloses a laser beam that is transmitted to the lamp by optical fiber and incident on a phosphor bead. A parabolic reflector then collimates the light.

JP 2004-354495 (NEC ViewTechnology, published 16 Dec. 2004) discloses a modification to this system whereby the phosphor is placed on a secondary reflector and the laser beam is collimated onto the phosphor and the emission is directed back onto the larger primary reflector for collimation.

JP 2003-295319 (Nitto Kogaku, published 15 Oct. 2003) discloses an alternative system where the laser is directly collimated by an optical system and the beam is focused through a phosphor with a curved secondary reflector beyond the phosphor to reconcentrate laser light passing through the phosphor.

These systems have fundamental issues which include the fact that the phosphors need to be supported above the reflector and the methods of support will reduce efficiency. In addition, effective cooling of the phosphor is very difficult, limited to convective methods with air or water that are complex and expensive to achieve. The systems also still have isotropic or involve recycled light through the phosphor that will involve some absorption loss.

WO2009/115976 (published 24 Sep. 2009) proposes an automotive front light comprising laterally distributed phosphor elements embedded in a common heatsink. In some embodiments, the output sides of the phosphors communicate with conical reflectors formed in the heatsink.

WO2009/024952 (published 26 Feb. 2009) proposes a spotlight in which a blue or ultraviolet LED source directs light through an optical plate onto a yellow phosphor mounted on the plate and with a heatsink mounted above the phosphor.

US2009/0322205 (published 31 Dec. 2009) proposes a device in which a blue LED illuminates a yellow phosphor to produce white light. A heatsink arrangement is provided in the form of a two dimensional mesh embedded in the phosphor and connected to an external heatsink. There is no optical system for concentrating light from the phosphor.

US2009/322197 (published 31 Dec. 2009) proposes a device is very similar to the device of US2009/0322205 except that the mesh embedded within the phosphor is omitted and the edge of the phosphor is thermally coupled to a metal housing which is thermally coupled to a heatsink.

US2004/0159900 (published 19 Aug. 2004) proposes a device in which a blue LED excites a yellow or red and green phosphor to produce white light, or in which an ultraviolet LED excites a red, green and blue phosphor. Both the LED and the phosphor may be mounted so as to be coplanar on a heatsink and an ultraviolet reflector may be disposed above both so as to reflect ultraviolet radiation from the LED onto the phosphor.

SUMMARY OF INVENTION

According to the invention, there is provided a lamp comprising a phosphor, a radiation source arranged to irradiate the phosphor with optical radiation for exciting the phosphor to produce visible light, an optical system arranged to concentrate the light produced by the phosphor, and a heatsink thermally connected to the phosphor and arranged to dissipate heat produced by the phosphor; in which the phosphor is mounted on a plane reflector disposed on or comprising the heatsink and facing a curved reflector and the radiation source.

According to a second aspect of the invention, there is provided a lamp comprising a phosphor, a radiation source arranged to irradiate the phosphor with optical radiation for exciting the phosphor to produce visible light, an optical system arranged to concentrate the light produced by the phosphor, and a heatsink thermally connected to the phosphor and arranged to dissipate heat produced by the phosphor; in which the optical system has an optical axis and in which the phosphor is substantially flat and is inclined with the respect to the optical axis.

The phosphor may be remote from the heatsink.

The heatsink may be disposed outside the optical system.

The phosphor may be mounted on a heat-conductive member to which the heatsink is mounted.

The heat-conductive member may comprise one of glass, sapphire glass.

The heat-conductive member may be transparent to at least one of the optical radiation and the visible light.

The phosphor may comprise a layer formed by deposition.

The phosphor may have a thickness relative to its lateral extent such that the phosphor has a substantially Lambertian light emission pattern.

The thickness of the phosphor may be less than 10% of its lateral half-extent.

The lamp may comprise a first filter disposed between the phosphor and the radiation source and arranged to pass the optical radiation and to reflect the visible light.

The lamp may comprise a second filter arranged to pass the visible light and to attenuate or block the optical radiation, the phosphor being disposed between the radiation source and the second filter.

The or each filter may be an interference filter.

The optical radiation may be electromagnetic radiation.

The optical radiation may be at least partly in the visible spectrum.

Additionally or alternatively the optical radiation may be at least partly in the invisible spectrum. The invisible spectrum may comprise the ultraviolet spectrum.

The radiation source may comprise a radiation emitter and a propagation path.

The radiation emitter may comprise one of a laser, a laser diode and a light emitting diode.

The propagation path may comprise at least one of a focusing optic, an optical fibre and a condenser.

In a lamp of the first aspect the optical system may have an optical axis which passes through the phosphor.

In a lamp of the second aspect the optical axis of the optical system may pass through the phosphor.

The propagation path may be at least partly along the optical axis.

The optical system may comprise a reflector.

The propagation path may pass through the reflector.

The optical system may comprise a lens.

It is thus possible to provide a lamp which is suitable for a wide variety of applications including lamp luminaires (e.g. spotlights), automotive applications (e.g. headlights) and handheld illumination devices (torches). A typical embodiment concerns illumination relating to the transmission of LED or laser light to a phosphor that is not local to the LED or laser. A reflector and/or lens system may then be used to transmit the phosphor light to the illumination area.

It is possible to produce a higher collimation from an optical system so that a lower power can be used to operate the system and also the system may be made significantly smaller. This will then use fewer materials, cheapen the manufacturing route and may be used on vehicles where weight and efficiency are a significant issue, such as electrically powered vehicles.

The foregoing and other objectives, features, and advantages of the invention will be more readily understood upon consideration of the following detailed description of the invention, taken in conjunction with the accompanying drawings.

DESCRIPTION OF EMBODIMENTS

Figure 4:
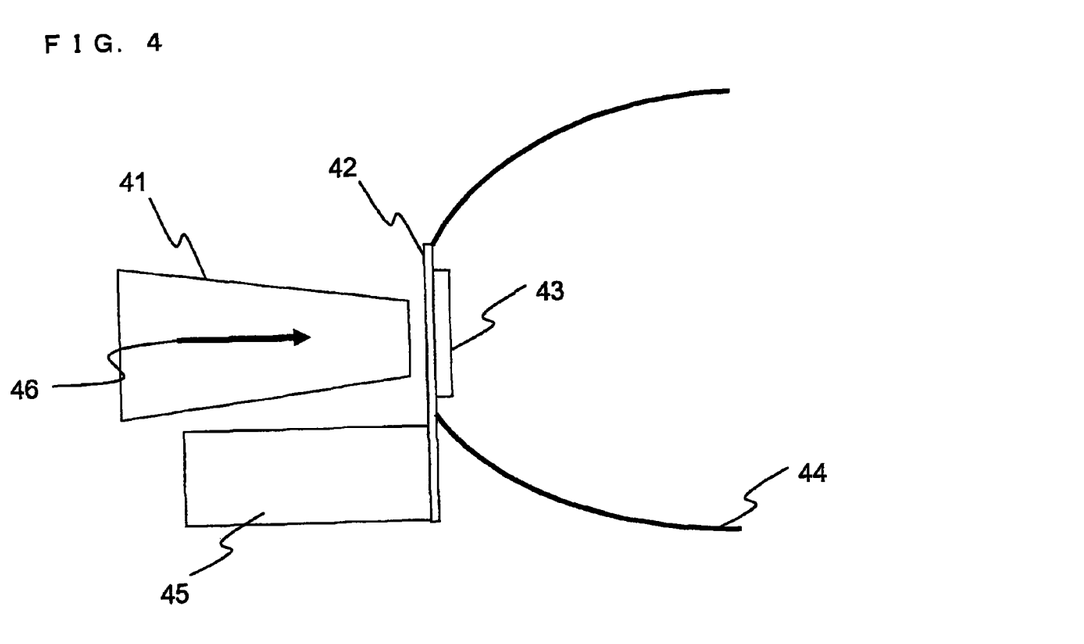
FIG. 4 illustrates an example of a lamp.

An example of a lamp is illustrated in FIG. 4. This shows a lamp comprising a phosphor, a radiation source arranged to irradiate the phosphor with optical radiation for exciting the phosphor to produce visible light, an optical system arranged to concentrate the light produced by the phosphor, and a heatsink thermally connected to the phosphor and arranged to dissipate heat produced by the phosphor.

The lamp of FIG. 4 includes a laser transmission method such as free space, an optical fiber or condenser structure (illustrated) 41 that transmits light 46 from a source (e.g. from a light emitting diode (LED), a laser diode or a laser), and a heat-conductive glass layer (such as sapphire) 42 on which has been deposited a thin layer of phosphor 43. The thin layer has a thickness that is significantly less (preferably much less) than the width (lateral extent) or length. The optical system arranged to concentrate the light produced by the phosphor may for example be a reflecting optical system 44 (for example a curved reflector) and/or the optical system may include lens systems to collimate or focus the light from the phosphor. The conductive glass layer is attached to a heatsink 45 separate from the system.

The heat-conductive glass layer may alternative comprise a conventional glass instead of a sapphire glass.

The optical radiation may be electromagnetic radiation. It may at least partly in the visible spectrum, and/or it may be at least partly in the invisible spectrum (for example it may be at least partly in the ultraviolet spectrum).

The phosphor layer is easier to manufacture, being able to be deposited using electrochemical methods. No resin mix is required and shaping of the layer along with patterning with different phosphors is possible. The phosphor is in conductive contact with a heatsink, which is a high efficiency thermal sink. The thin layer allows Lambertian emission from the surface, which has a lower etendue than isotropic and thus improved collimation. The thin layer also reduces the absorption of emitted light and improves performance.

The etendue size of this source is determined by the width and height of the phosphor and so needs to be as small as possible, limited by the condenser front area or light source focus, and the phosphor is shown with an exaggerated size in relation to the reflector 44.

The thin nature of the phosphor means that the natural emission profile is Lambertian rather than isotropic and this further improves the etendue of the source due to the reduced angular profile width.

The manufacture of the phosphor layer may involve electro-deposition, which means that the phosphor may be pure and may not involve a resin other than a possible encapsulation layer.

The phosphor is deposited on a high heat-conductivity transparent glass 42 such as sapphire, which may be layered on normal glass (not shown). The glass is attached to a heat sink 45, which allows a conductive heat path away from the phosphor allowing efficient cooling. This can be further improved by normal convective cooling such as air or water cooling of the heat sink or phosphor (not shown). By "transparent" is meant that the glass 42 is transparent to at least one of the visible light produced by the phosphor and the optical radiation from the radiation source.

The lamp may have a front filter of known type that substantially prevents the laser or LED light from emerging from the lamp.

The phosphor may be a construction of one or more phosphors in order to obtain a white light source. The phosphor may be Cerium YAG phosphors or a mixture of the following phosphors Ca-α-SiAlON:Ce (blue-green), Ca-α-SiAlON:Eu (yellow), $CaAlSiN_3$:Eu (red) or β-SiAlON:Eu (green) or others. Any suitable phosphor or phosphor mixture may be used.

The incident excitation beam may be designed to be scattered from the phosphor and form part of the light emission to balance the colour, for example to white.

Figure 5:
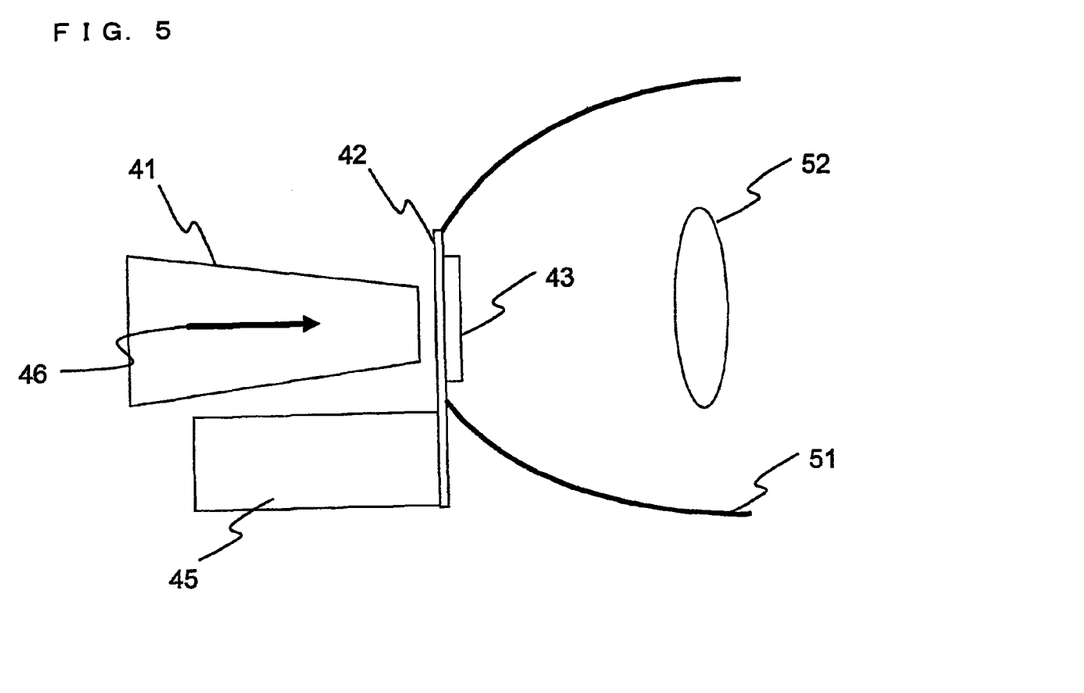
FIG. 5 illustrates an alternative example involving a reflector and lens structure.

In the lamp shown in FIG. 5, a reflector 51 and a lens 52 are used to create a collimated system. The lens is positioned such that it will collimate or focus the light from the phosphor onto the target or into the far field.

As the emission of the phosphor is now more forward directed with a near-Lambertian profile, the lens is desirable when trying to fully optimize the system.

Figure 6:
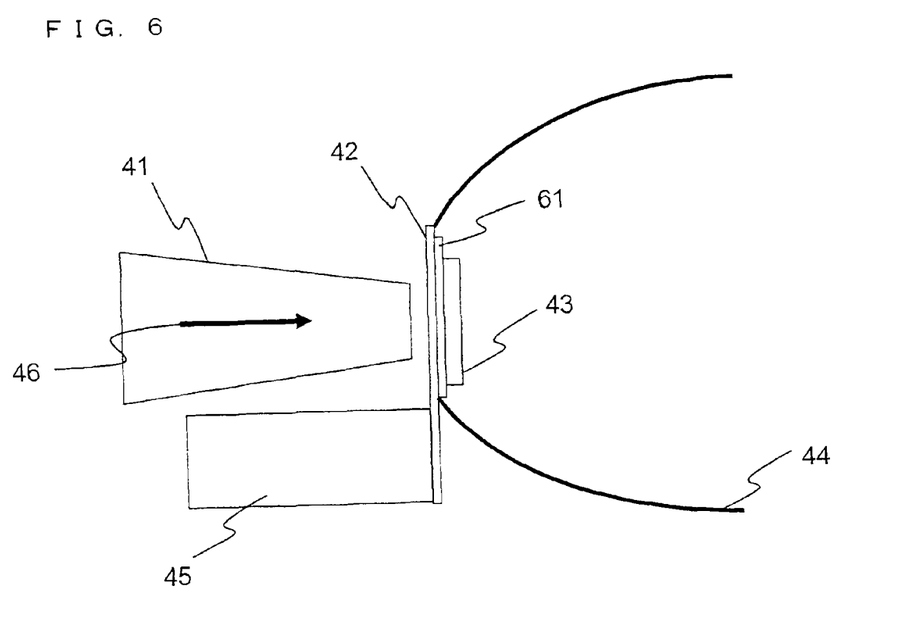
FIG. 6 illustrates an alternative example with an interference filter between laser and phosphor.

In the lamp shown in FIG. 6, an interference filter 61 is shown between the sapphire glass 42 and the phosphor 43. It is also possible to place the filter at any location between the light source and the phosphor (e.g. on the other side of the glass 42 or on the end of the condenser 41). However, it is recommended that it is close to the phosphor.

The emission from the phosphor is Lambertian but the emission is in two directions. A significant fraction of the emitted light will be emitted back towards the light source, which in general will not be efficiently recycled and so can be considered a loss to the system.

The filter is an interference filter which allows the light source light 46 to pass but reflects the white light emission from the phosphor. This system is preferred where the light source light 46 does not form part of the white light emission, e.g. a 405 nm laser.

Figure 7:
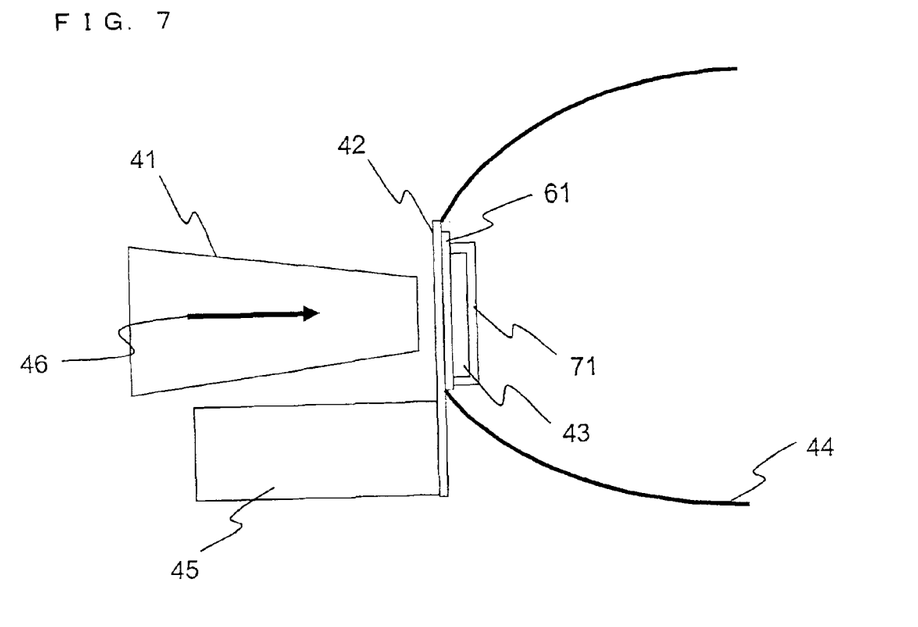
FIG. 7 illustrates an alternative example with a second laser blocking filter on top of the phosphor.

In the lamp shown in FIG. 7, a further interference filter 71 is disposed on the phosphor layer and is designed to transmit white light and block the light source light 46. This may be used as a safety measure, for example if the light source light is a laser beam.

Figure 8A:
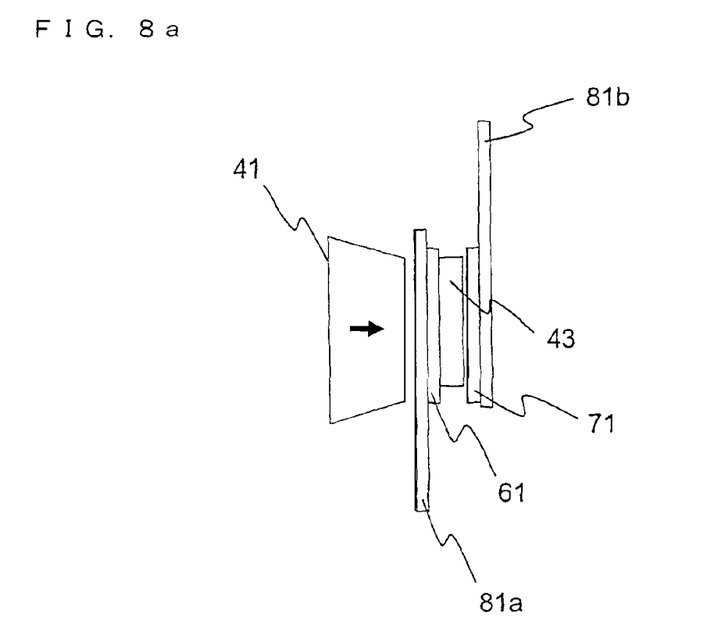
FIGS. 8a and 8b illustrate alternative arrangements of filters.
Figure 8B:
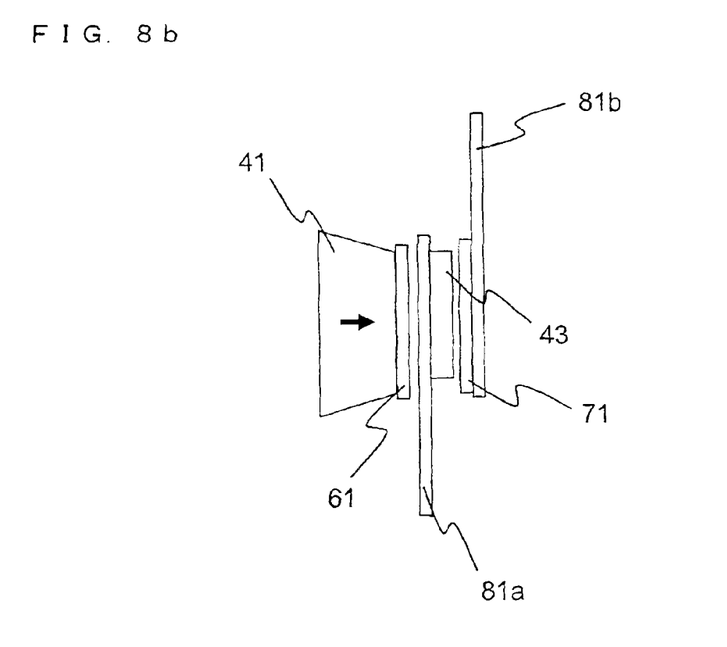

In another lamp, a second transparent layer may be introduced to make the manufacture of the various filters a simpler matter to assemble. FIG. 8a shows an arrangement whereby the filter 71 is deposited on a separate glass layer 81b, whereas the phosphor 43 and white light reflecting filter 61 are deposited on the heat conducting glass 81a. FIG. 8b shows an alternative arrangement whereby the white light reflecting filter 61 is deposited on the condenser 41 and the phosphor 43 alone is deposited on the heat conducting glass 81a. In the latter case, the manufacture is simpler as only one layer exists on each glass surface.

Figure 9:
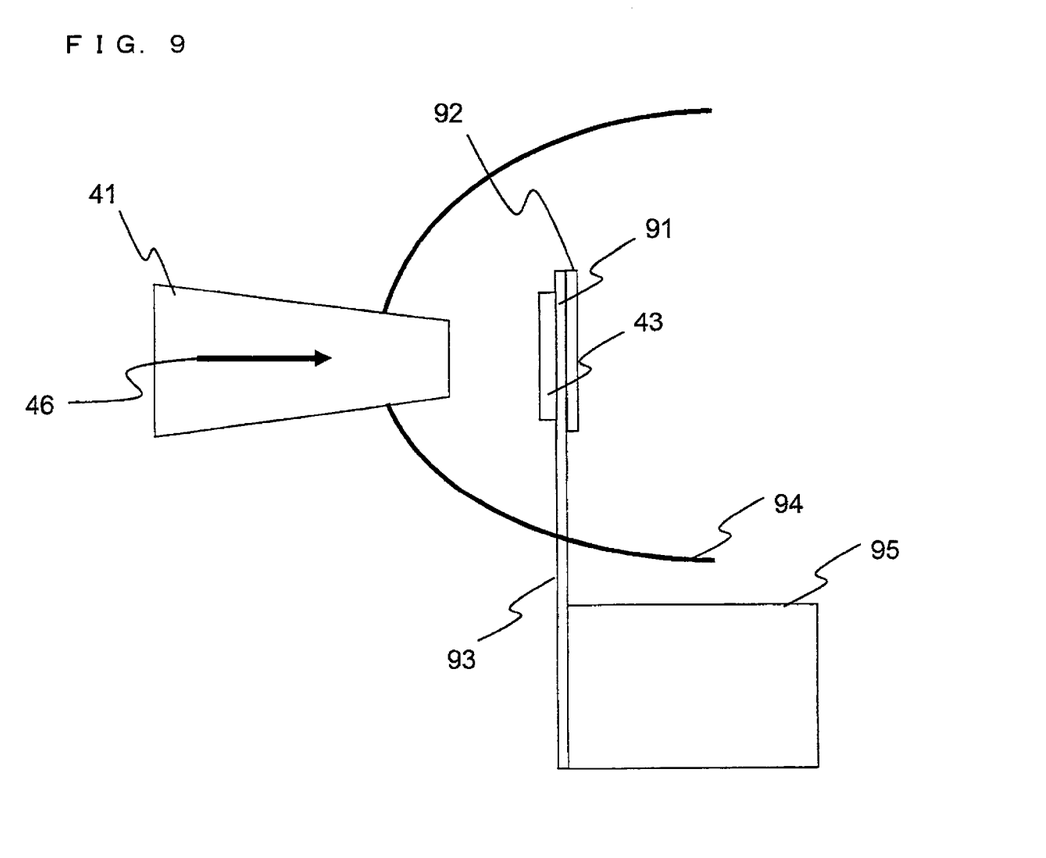
FIG. 9 illustrates an alternative example with a reversed phosphor.

In the lamp shown in FIG. 9, the phosphor layer 43 is disposed further along the light transmission direction of the system and is illuminated directly. The supporting heat conducting glass 91 is further away from the light source. A reflector 92 may be disposed behind the phosphor, but this is not essential.

In this case, the light emitted from both sides of the phosphor is more efficiently used. In addition, electro-deposition of the phosphor would require an electrically conductive path such as indium tin oxide (ITO) layers. These could absorb some light so they would need to be very thin, which would slow the deposition technique due to their surface resistance. In this embodiment, a thicker ITO layer can be used as the transmission is less important.

This example may be preferred for free-space light 46 transmission methods, without a glass condenser.

Figure 10:
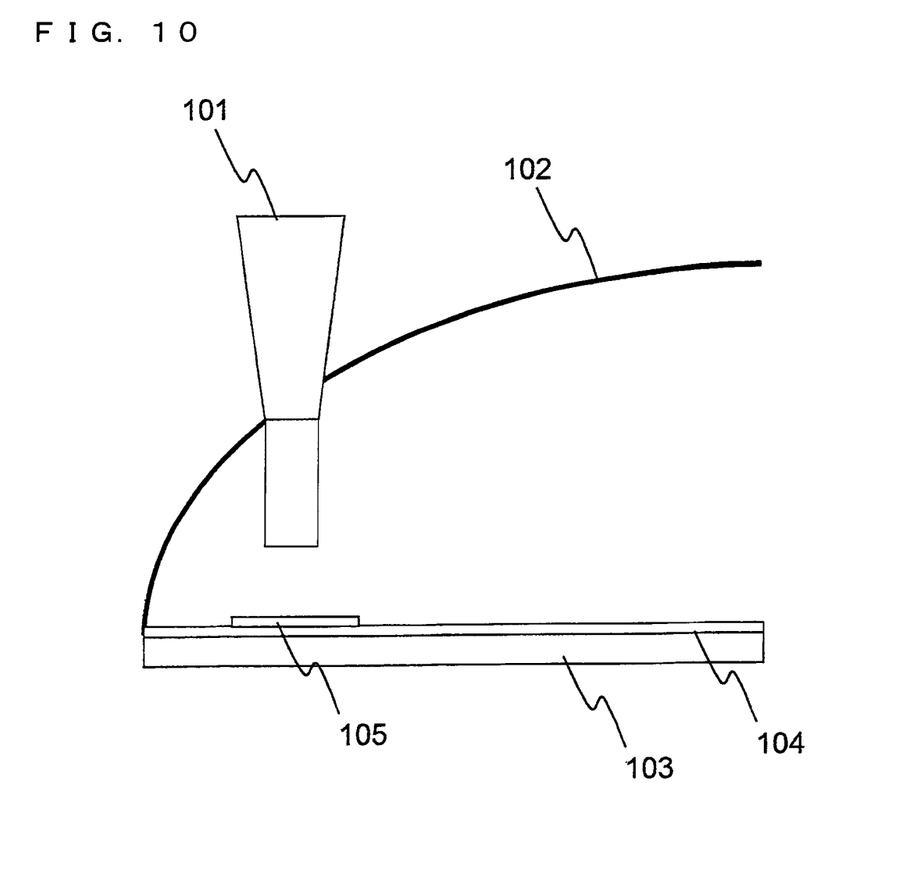
FIG. 10 illustrates an embodiment of the invention with half-reflector.

In the embodiment of this invention shown in FIG. 10 the phosphor layer 105 is mounted on a reflector (for example a plane reflector) disposed on or comprising the heatsink and facing a curved reflector and the radiation source. For example as shown in FIG. 10 the phosphor layer 105 is deposited on a reflector layer 104 (for example a plane reflector layer) and heat sink 103. The plane reflector layer 104 should consist of a thermally conducting material to allow transport of heat from the phosphor to the heat sink. For example, the reflector layer 104 may be a silver coating applied to the heat sink 103 (which may be formed from a material with low reflectivity, for example copper).

The curved reflector, in this example a half reflector 102, forms, with the plane reflector layer 104, an optical system for collimating light emitted by the phosphor. The optic axis of the optical system may pass through the phosphor 105, although this is not necessary since in this embodiment the optical system retains a similar efficiency/degree of collimation whether its optic axis passes through the phosphor or not. The incident light can be transmitted by condenser 101 through the reflector 102, but can also be transmitted in free space by a focused beam through a small hole in the reflector with the diverging beam illuminating the phosphor. By this arrangement, the excitation illumination is incident on the phosphor on the same side as the resulting luminescent emission from the phosphor. This embodiment may work best where the incident light is part of the final white light source. By mounting the phosphor on top of the reflecting layer, or heat sink, the light emitted from the phosphor may exit the reflector readily without possibly becoming trapped by the heat sink inside the reflector cavity.

If the heat sink 103 of FIG. 10 has a sufficiently high reflectivity, the reflective layer 104 of FIG. 10 may be omitted so that the phosphor 105 is mounted on the upper, reflective surface of the heat sink 103. In this case, the optical system for concentrating light emitted by the phosphor 105 is formed by the curved reflector 102 and the upper surface of the heat sink 103.

Figure 11:
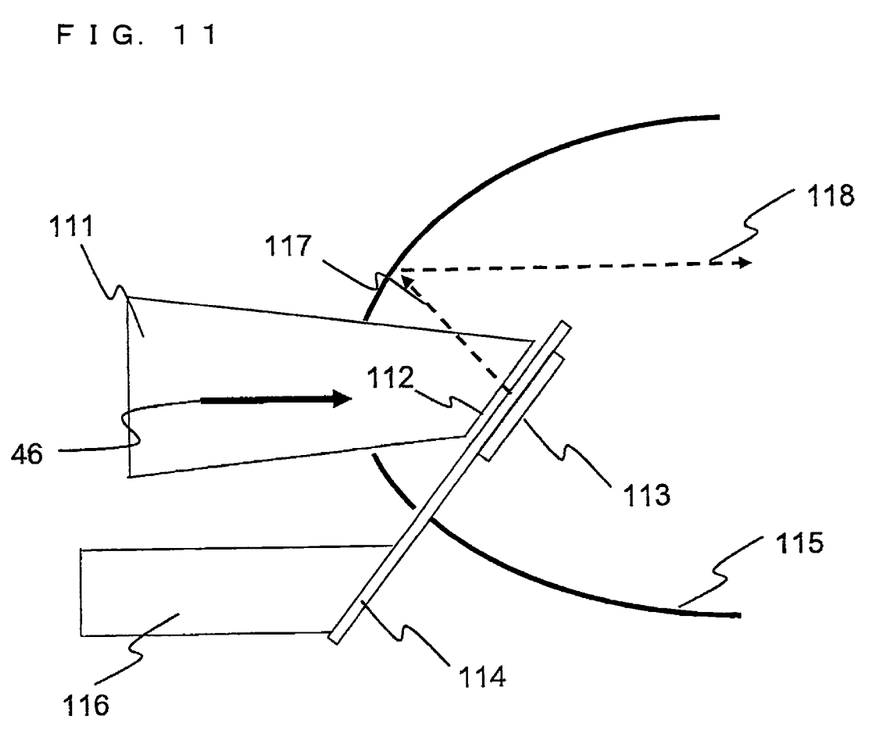
FIG. 11 illustrates an alternative embodiment with an angled phosphor.

In the embodiment of this invention shown in FIG. 11, the optical system for concentrating light produced by the phosphor comprises a reflector 115 which may be, for example, a hemispherical reflector, a parabolic reflector, or another reflector in the form of a surface of a solid of revolution. The phosphor 113 is tilted relative to the symmetry axis of the reflector 115, which constitutes an optical axis of the optical system for concentrating light produced by the phosphor. Optionally, the optical axis of the optical system passes through the phosphor 113. Optionally, the phosphor 113 may also be tilted relative to the symmetry axis of the condenser system 111, which—and in this case, the condenser end 112 may also be tilted relative to the symmetry axis of the condenser system 111 to improve transmission onto the phosphor. The embodiment may work with a free space transmission method (e.g. direct focused beam).

In this case, the emission in both directions from both sides of the phosphor is angled (117) so as to reduce the light transmitted back to the light source and thus lost; instead it is transmitted and collimated 118. The phosphor 113 is disposed on highly heat conductive glass 114 connected to heat sink 116.

FIG. 11 illustrates a further feature of the invention. In this embodiment light 46 from the light sources that illuminates the phosphor propagates along a propagation path which, in this example, comprises the condenser 111. The propagation may, as in the example of FIG. 11, be at least partly along the optical axis of the optical system for concentrating light produced by the phosphor (e.g. at least partly along the optical axis of the reflector 115 in the example of FIG. 11).

The above embodiments refer to white light output, but any colour output may be provided depending on the phosphor and incident light choice. Indeed, the colour may be controlled by changing the wavelength or mixing wavelengths of the incident laser/LED light.

As explained above, it is preferable that the phosphor layer is made sufficiently thin, relative to its area, that emission from the phosphor is substantially Lambertian (for example, such that the intensity of the emission from the phosphor varies with viewing angle (with respect to the normal to the phosphor) in a way that is closer to a Lambertian distribution than to an isotropic distribution). Preferably the thickness of the phosphor layer should be made such that the ratio of the area of the top light-emitting surface of the phosphor layer to the area of the side light-emitting surfaces of the phosphor layer is at least 5:1—this should give substantially Lambertian emission, provided that the emission of light is evenly distributed over all emitting surfaces of the phosphor.

For example, in the case of a circular phosphor layer having radius r and thickness t, the surface area of the top light-emitting surface of the phosphor layer is $\pi r^2$ and the surface area of the side light-emitting surface of the phosphor layer is $2\pi r \times t$. To ensure that the ratio of the area of the top light-emitting surface of the phosphor layer to the area of the side light-emitting surfaces of the phosphor layer is at least 5:1 therefore requires that the ratio of the radius to the thickness is at least 10 (i.e., r/t>10). It can also be shown that this applies for a square phosphor layer, that is the ratio of the half-width of the phosphor to the thickness should be at least 10 in order for the ratio of the area of the top light-emitting surface of the phosphor layer to the area of the side light-emitting surfaces of the phosphor layer to be at least 5:1. Thus, as a general rule, the thickness of the phosphor is preferably less than 10% of its lateral half-extent. The phosphor may typically have a thickness in the range of 30-100 μm, and may typically have a width of 2 mm or greater.

Although the invention has been shown and described with respect to certain embodiments, it is obvious that equivalents and modifications will occur to others skilled in the art upon the reading and understanding of the specification. The present invention includes all such equivalents and modifications, and is limited only by the scope of the following claims.

For example, although the figures show a propagation path that includes a condenser (such as the condenser 101 or 111 of FIG. 10 or 11), the propagation path of the light 46 that illuminates the phosphor may additionally or alternatively include a focusing optic and/or an optical fibre.

Furthermore, although the white light reflecting filter 61 and the filter 71 for blocking the light source light 46 are shown only in FIGS. 6 to 8b, these filters may be provided in other embodiments. For example, the embodiments of any one of FIGS. 9, 10 and 11 may be provided with a white light reflecting filter 61 and/or a filter 71 for blocking the light source light 46.

The invention claimed is:

1. A lamp comprising a phosphor, a radiation source arranged to irradiate the phosphor with optical radiation that is at least partly in the visible spectrum for exciting the phosphor to produce visible light, an optical system arranged to concentrate the light produced by the phosphor, and a heatsink thermally connected to the phosphor and arranged to dissipate heat produced by the phosphor; in which the phosphor is mounted on a plane reflector being at least one of disposed on the heatsink and a reflective surface of the heat sink, and facing a curved reflector and the radiation source;

the lamp further comprising at least one filter layer that is transparent to the optical radiation but reflects visible light emitted by the phosphor, wherein the filter layer is disposed between the phosphor and the optical radiation source; and a heat-conductive member positioned after the optical radiation source and before the phosphor in the path of the optical radiation, wherein the heatsink is in thermal communication with the heat-conductive member that is transparent to the optical radiation, and the optical radiation passes through the heat-conductive member before reaching the phosphor.

2. A lamp as claimed in claim 1, in which the phosphor is remote from the heatsink.

3. A lamp as claimed claim 2, in which the heatsink is disposed outside the optical system.

4. A lamp as claimed in claim 1, in which the heat-conductive member comprises one of glass and sapphire glass.

5. A lamp as claimed in claim 1, comprising a second filter arranged to pass the visible light emitted by the phosphor and to attenuate or block the optical radiation, the phosphor being disposed between the radiation source and the second filter.

6. A lamp as claimed in claim 1, in which the radiation source comprises a radiation emitter and a propagation path.

7. A lamp as claimed in claim 6, in which the radiation emitter comprises one of a laser, a laser diode and a light emitting diode.

8. A lamp as claimed in claim 6, in which the propagation path comprises at least one of a focusing optic, an optical fibre and a condenser.

9. A lamp as claimed in claim 6 when dependent directly or indirectly from claim 1, in which the optical system has an optical axis which passes through the phosphor.

10. A lamp as claimed in claim 9, in which the propagation path is at least partly along the optical axis.

11. A lamp as claimed in claim 6, in which the optical system comprises a reflector.

12. A lamp as claimed in claim 11, in which the propagation path passes through the reflector.

13. A lamp as claimed in claim 1, in which the optical system comprises a lens.

14. A lamp comprising a phosphor, a radiation source arranged to irradiate the phosphor with optical radiation for exciting the phosphor to produce visible light, an optical system arranged to concentrate the light produced by the phosphor, and a heatsink thermally connected to the phosphor and arranged to dissipate heat produced by the phosphor; in which the optical system has an optical axis and in which the phosphor is substantially flat and is inclined with the respect to the optical axis;

the lamp further comprising a heat conductor inclined parallel with the phosphor that thermally connects the phosphor to the heat sink.

15. A lamp as claimed in claim 14, in which the optical axis of the optical system passes through the phosphor.

16. A lamp as claimed in claim 14, further comprising a condenser system with an inclined condenser end inclined parallel to the phosphor.

* * * * *